United States Patent Office 3,070,388
Patented Dec. 25, 1962

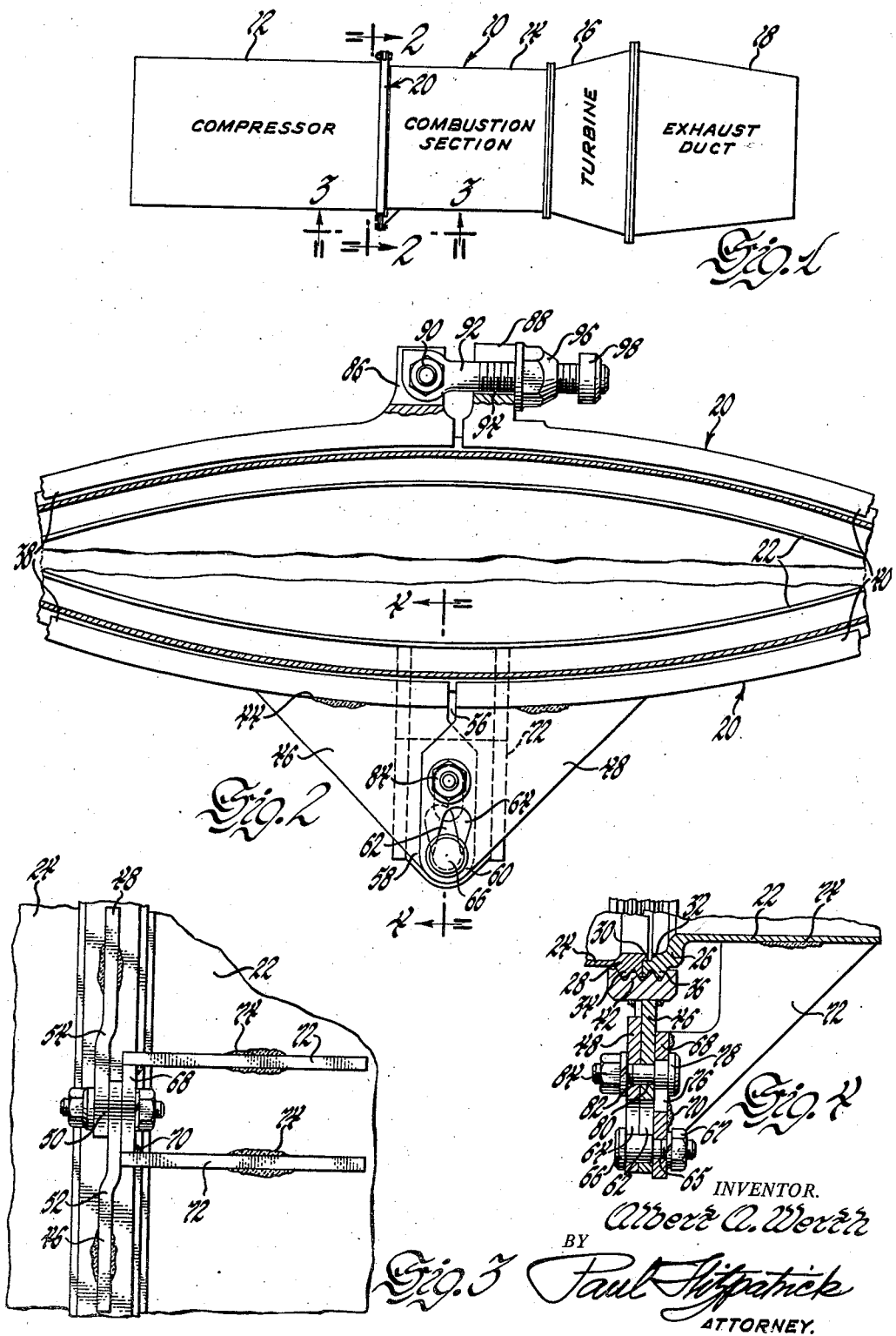

3,070,388
ENGINE RING CLAMP HAVING HINGE MEANS TO PERMIT OUTWARD RADIAL MOVEMENT OF THE CLAMP
Albert A. Werth, Destin, Fla., assignor to General Motors Corporation, Detroit, Mich., a corporation of Delaware
Continuation of abandoned application Ser. No. 691,866, Oct. 23, 1957. This application Feb. 24, 1960, Ser. No. 10,801
5 Claims. (Cl. 285—411)

This application is a continuation of my co-pending application U.S. S.N. 691,866, filed October 23, 1957, entitled Engine Ring Clamp and now abandoned.

This invention relates to a ring clamp for joining gas turbine engine sections together.

In previous constructions of gas turbine engines, the several sections to be axially joined were connected by annular flanges secured together by a great number of bolts. To disassemble such a structure, considerable time was involved in removing all of the bolts. This invention eliminates such an operation by providing a ring clamp with a hinge at one point and a take-up clamp at an opposite point and a single nut and bolt securely fastening the clamp together.

Therefore, it is an object of this invention to provide an engine case ring clamp that is simple to assemble or disassemble, and is manufactured with a minimum number of parts.

It is a further object of this invention to provide an engine case ring clamp supported on one of the members and having a hinge means having cam slots to permit outward radial movement of the sections of the ring clamp with respect to the engine, thereby providing a maximum amount of clearance for assembly and disassembly of the engine.

Other features, advantages and objects will become apparent by reference to the detailed description of the invention and to the drawings wherein:

FIGURE 1 is a diagrammatic illustration of a gas turbine engine embodying this invention, FIGURE 2 is an enlarged cross-sectional view of portions of the engine case ring clamp of FIG. 1 taken on a plane indicated by and viewed in the direction of the arrows 2—2 of FIGURE 1, FIGURE 3 is an enlarged bottom view of the engine case ring clamp taken on a plane indicated by and viewed in the direction of the arrows 3—3 of FIGURE 1, and FIGURE 4 is a cross-sectional view of the clamp hinge and mounting mechanism taken on a plane indicated by and viewed in the direction of the arrows 4—4 of FIGURE 2.

Referring to the drawings and more particularly to FIGURE 1, there is shown therein diagrammatically a gas turbine engine 10 comprising a compressor section 12, combustion section 14, turbine section 16 and exhaust duct 18. The annular clamp 20 embodying this invention is shown in this figure as connecting the compressor and combustion sections of the engine. However, it will be obvious that this clamp may also, for example, connect the combustion section to the turbine section, or the turbine section to the exhaust duct, or all of the sections may be joined by similar clamps.

Referring to FIGURES 2 to 4, the cylindrical combustion and compressor section casings 22 and 24 each have annular upstanding or projecting flanges 26 and 28, respectively, formed at their adjacent ends, and adapted to abut each other. To prevent misalignment of the two sections when they are brought together to be joined, the flange 28 is provided with a circumferential projection 30 adapted to cooperate with a circumferential step or recess 32 provided in the abutting flange 26. Formed on the outer surfaces of said flanges 26 and 28 are a plurality of spaced circumferentially extending ridges or teeth 34 and 36, respectively.

The ring clamp 20 is composed of two semi-circular sections 38 and 40 each having formed internally thereof a plurality of spaced circumferentially extending teeth or ridges 42. The ridges 42 are adapted to cooperate with the ridges 34 and 36 and mesh or interengage with the same when the clamp is in engaging position to prevent axial relative movement of the compressor and combustion sections.

The means for causing engagement of the ridges 34, 36 and 42 will now be discussed. Secured to the bottom of the ring clamp sections 38 and 40 at 44 are projecting flanges 46 and 48, respectively. As seen in FIGURES 2 and 3, these flanges 46 and 48 extend along the circumference of the ring clamp sections for a short distance and overlap each other at 50 by being bent or offset at 52 and 54. As seen in FIGURE 2, each of the flange members is relieved at 56 to eliminate interference of the parts when the clamp is closed. At their outermost ends 58 and 60, the flanges 46 and 48 are provided with combination radially and axially cut cam follower slots 62 and 64, respectively, each directed at a different diagonal angle to the vertical axis of the ring clamp.

The flanges are joined together by a stepped pin or cam 66 extending through slots 62 and 64. Pin 66 is supported by insertion in a bore 65 in a clamp support member 68 suitably secured as by welds 70 to brackets 72 secured to the combination section casing at 74. The support member 68 is further provided with a vertical or radially extending slot 76 adapted to slidably contain a stepped hinge pivot pin 78 extending through suitable bores 80 and 82 of flanges 46 and 48, respectively, and secured to the flange members 46 and 48 by a nut 84 threaded on the pin.

Formed at the ends of the sections 38 and 40 diametrically opposite the hinge point connection are upstanding flanges 86 and 88, the flange 86 being bored to receive a cross pin and nut 90 pivotally securing a threaded bolt 92 thereto. The flange 88 is suitably slotted at 94 for receiving the bolt 92 and a nut 96 is threaded on the bolt to pull the sections 38 and 40 together. A jam nut 98 may also be provided.

*Operation*

The method of assembling the ring clamp 20 will now be described. Since the bracket 72 is welded to the combustion section casing at 74, the sections 38 and 40 of the ring clamp 20 are telescoped over the end of the combustion section so as to align the bores 80 and 82 in the flanges 46 and 48 with the slot 76 in the cross member 68. The hinge pivot pin 78 is then inserted through the slot and bores and secured to the flange members by the nut 84. The slots 62 and 64 are then aligned with the bore 65 in the cross member 68, and then pin 66 is inserted therethrough and secured thereto by the nut 67. The ring clamp now has a limited arcuate opening movement with the hinge pin 78 slidable vertically or radially in the slot 76 and the flanges 46 and 48 slidably cammed by the pin 66 by means of the slots 62 and 64. The combustion section is then aligned with the compressor section with the respective flanges 24 and 26 abutting each other, the projection 30 being received within the recess or step 32. This aligns the two sections and places the ridges 28 and 36 in position to be engaged by the ridges 42 on the ring clamp 20. The two ring clamp sections 38 and 40 are then pulled together by inserting the bolt 92 in the slot 94 and threading the nut 96 thereon. Tightening of the nut 96 causes the flanges 46 and 48 to pivot about the hinge pin 78 with the stationary pin 66 camming the flanges 46 and 48 radially by means of the cam slots 62 and 64, so as to position the pin 66 in the bottom portion of the slots. The hinge pin 78 simultaneously moves vertically in the slot 76 to permit the motion imparted to the flanges. This pulling motion exerts a force upon the sections 38 and 40 securely intermeshing the ridges 28, 36 and 42 to prevent axial separation of the sections.

When it is desired to disconnect the two sections, it is only necessary to remove the nut 96 from the bolt 92, and separate the bolt 92 from the slot 94. This separation causes each of the ring clamp sections to move down and away from the combustion section by the camming of the flanges 46 and 48 on the pin 66 and the radial movement of the hinge pin 78. When the pin 66 is against the top of the slots 62 and 64, the ridges 42 will be disengaged from the circumferential ridges 28 and 36 on the two abutting sections, and the sections can then be pulled apart. If, for some reason, it is desired to further separate the ring clamp sections, it is only necessary to remove one or the other of pins 78 and 66. The ring clamp may of course be disassembled also by removing both pins 78 and 66.

From the foregoing it will be seen that this invention provides an efficient quick disconnect ring clamp supported from one of the sections to be joined while providing means for preventing lateral and axial relative movement of the sections to be joined as well as means for aligning the sections upon initial assembly. It will further be seen that this invention provides a clamp that can be assembled or disassembled with a minor number of operations, thus reducing the time necessary for the entire disassembly of a gas turbine engine. It will be understood that the invention can be modified beyond the illustrated preferred embodiment, and therefore, any limitations to be imposed are those set forth in the following claims.

I claim:

1. A ring clamp for joining adjacent ends of axially aligned substantially cylindrical members comprising two semi-cylindrical sections connected to each other and together surrounding and overlapping the ends of said members, said sections and ends each having interengageable means formed thereon when interengaged preventing axial relative movement therebetween, connecting means pivotally securing one set of adjacent ends of said sections to each other and to one of said members for a radially slideable and pivotal movement of said sections with respect to said members, and fastening means secured to the opposite adjacent set of ends of said sections connecting the same to clamp said sections together interengaging said interengageable means and securing said members against axial relative movement, said connecting means including pivotal means mounted on one of said members for substantially radial movement with respect thereto and means secured to each of said sections having portions adapted to overlap each other, said overlapping portions each having a cam follower slot therein so constructed and positioned as to overlap and extend at an angle with respect to the other, and cam means secured to said connecting means and slideable in both of said slots simultaneously to arcuately swing said portions and sections relative to each other and simultaneously cam said portions radially outwardly upon disengagement of said fastening means and circumferential separation of said section ends cooperating therewith.

2. A ring clamp as in claim 1 wherein said pivotal means also includes support means secured to said one member and having a substantially radially extending slot therein, and pin means pivotally connecting said portions to each other and being slideably secured in said slot, the camming of said sections outwardly radially sliding said pin means in said support means slot to radially move and arcuately swing said sections to disengage said interengageable means and said members.

3. A ring clamp for joining a plurality of axially aligned substantially cylindrical members, the adjacent portions of said members being formed circumferentially with upstanding ridges, said clamp comprising a plurality of semi-cylindrical sections facing each other, said sections each being formed internally with a plurality of circumferentially extending ridges adapted to cooperate with said upstanding ridges preventing axial relative movement therebetween upon radial engagement of said members and said sections, flange elements fixed to each of said sections at one of their adjacent ends, said flange elements overlapping each other, axially extending flange means secured to one of said members, said means having a radially extending slot therein, pin means pivotally connecting said flange elements and slidably engaging said radial slot for radial movement therein, said pin means permitting both pivotal movement of said sections about said pin means and radial movement of said sections in relation to said slot when said clamp is opened, cam means connected to said flange means and radially aligned with said pin means, said cam means engaging slots in said flange elements to limit the pivotal movement of said sections about said pin means and to move said pin means radially as said clamp is opened, said slots diverging from said cam means in the direction of said pin means when said clamp is in a closed position, and adjustable means connecting said sections at adjacent ends opposite said first mentioned ends, one adjustment of said means providing a radially outward separation of said ridges to permit axial movement of said members.

4. A ring clamp as defined in claim 3 wherein said axially extending flange means includes a transversely extending portion and said radially extending slot is disposed in said portion.

5. A ring clamp as defined in claim 3 wherein said cam means is disposed radially outwardly from said pin means.

References Cited in the file of this patent

UNITED STATES PATENTS

| | | |
|---|---|---|
| 674,454 | Carter | May 21, 1901 |
| 1,958,923 | Mohler | May 15, 1934 |
| 2,640,717 | Scheuring | June 2, 1953 |
| 2,689,141 | Kiekhaefer | Sept. 14, 1954 |
| 2,715,477 | North | Aug. 16, 1955 |
| 2,788,993 | Oldham | Apr. 16, 1957 |
| 2,793,387 | Odell | May 28, 1957 |

FOREIGN PATENTS

| | | |
|---|---|---|
| 370,439 | Great Britain | Apr. 8, 1932 |
| 458,156 | Italy | July 1, 1950 |